(12) United States Patent
Mittal et al.

(10) Patent No.: US 8,219,085 B2
(45) Date of Patent: Jul. 10, 2012

(54) METHOD AND APPARATUS FOR OPTIMIZING COMPRESSED MODE DURATION

(75) Inventors: Mukesh K. Mittal, San Diego, CA (US); Mohit Narang, Cupertino, CA (US)

(73) Assignee: Qualcomm Incorporated, San Diego, CA (US)

(*) Notice: Subject to any disclaimer, the term of this patent is extended or adjusted under 35 U.S.C. 154(b) by 674 days.

(21) Appl. No.: 12/367,861

(22) Filed: Feb. 9, 2009

(65) Prior Publication Data
US 2010/0203889 A1    Aug. 12, 2010

(51) Int. Cl.
*H04W 4/00* (2009.01)
(52) U.S. Cl. ........ 455/434; 455/436; 455/515; 370/331; 345/100; 345/31
(58) Field of Classification Search .......... 455/436–444, 455/434, 515; 370/331
See application file for complete search history.

(56) References Cited

U.S. PATENT DOCUMENTS

| 5,722,073 | A * | 2/1998 | Wallstedt et al. ............. 455/437 |
| 5,873,047 | A * | 2/1999 | Nakano et al. ................ 455/561 |
| 7,702,343 | B2 | 4/2010 | Manohar |
| 2007/0037601 | A1* | 2/2007 | Mittal et al. .................. 455/525 |

FOREIGN PATENT DOCUMENTS

| EP | 1971176 A2 | 9/2008 |
| WO | WO2008060236 | 5/2008 |

OTHER PUBLICATIONS

International Search Report & Written Opinion—US2010/023676—International Search Authority—European Patent Office—May 11, 2010.

* cited by examiner

*Primary Examiner* — Vladimir Magloire
(74) *Attorney, Agent, or Firm* — Abdollah Katbab (57) ABSTRACT

An apparatus and method for optimizing compressed mode duration comprising collecting a first set of receive signal strength indication (RSSI) measurements from at least one 2G cell; determining a best 2G cell from the at least one 2G cell using the first set of RSSI measurements; identifying at least one second best 2G cells with at least one of the first set of RSSI measurements within a range threshold $T_R$ of the best 2G cell; collecting a second set of RSSI measurements from the second best 2G cells; identifying at least one third best 2G cells with at least one of the second set of RSSI measurements within the range threshold $T_R$ of the best 2G cell; and collecting a third set of RSSI measurements from the third best 2G cells.

60 Claims, 6 Drawing Sheets

METHOD AND APPARATUS FOR OPTIMIZING COMPRESSED MODE DURATION

FIELD

This disclosure relates generally to apparatus and methods for wireless transmission efficiency. More particularly, the disclosure relates to optimizing compressed mode duration.

BACKGROUND

Mobile user equipments (UEs) typically transition from one wireless system to another wireless system depending on their mobility and the availability of coverage by the wireless systems. For example, transitions can occur between second generation (2G) and third generation (3G) wireless systems, between long term evolution (LTE) and 3G wireless systems or between LTE and Global System for Mobile Communications (GSM) wireless systems. Taking one example, 2G wireless systems typically provide basic digital voice and low rate data services to user equipment (UE) over a broad coverage area. That is, the 2G wireless systems typically have ubiquitous coverage. Broad coverage area is implemented using a plurality of cells, each with an access node (e.g. base station) to provide a wireless access connection between a ULE, which is mobile within the coverage area, and the wireless communication system. The wireless access connection may employ space division multiple access (SDMA), frequency division multiple access (FDMA), time division multiple access (TDMA), code division multiple access (CDMA) and/or orthogonal frequency division multiple access (OFDMA) to allow a plurality of UEs to access the wireless communication system. In one example, the 2G wireless system is based on Global System for Mobile Communications (GSM)/General Packet Radio Service (GPRS)/Enhanced Data Rates for GSM Evolution (EDGE) while the 3G wireless system is based on Universal Mobile Telecommunication System (UMTS) which employs wideband code division multiple access (WCDMA).

Many wireless communications systems are upgrading their infrastructure to provide enhanced communication services, such as high rate data services and Internet protocol (IP) packet transport services to mobile UEs. These enhanced communication services are typically provided by 3G wireless systems. In many cases, the 3G wireless systems are implemented only in portions of the broad coverage area provided by 2G wireless systems. That is, in many cases 3G wireless systems do not provide ubiquitous coverage. 3G coverage areas are typically situated in high density population areas, such as the centers of urban areas, airports, shopping centers, business parks, etc. In this case, 3G coverage areas appear as islands of coverage within the broader 2G coverage areas. This diversity of coverage areas introduces the necessity of transitioning the wireless access connection of the mobile UE between the 2G coverage area and 3G coverage area. Although the example of transitioning between the 2G coverage area and 3G coverage area is discussed here, the UE may transition between any coverage areas of any radio access technologies employed by any wireless systems, including but not limited to, UMTS (universal mobile telecommunication system), WCDMA (wideband code division multiple access), GSM (Global System for Mobile communications), GSM/GPRS (General Packet Radio Service)/EDGE (Enhanced Data Rates for GSM Evolution), LTE (long term evolution), IS-95 (interim standard 95), CDMA2000, EVDO (evolution data optimized) or UMB (ultra mobile broadband), etc.

SUMMARY

Disclosed is an apparatus and method for optimizing compressed mode duration. According to one aspect, a method for optimizing compressed mode duration comprising collecting a first set of receive signal strength indication (RSSI) measurements from at least one 2G cell; determining a best 2G cell from the at least one 2G cell using the first set of RSSI measurements; identifying at least one second best 2G cells with at least one of the first set of RSSI measurements within a range threshold $T_R$ of the best 2G cell; collecting a second set of RSSI measurements from the second best 2G cells; identifying at least one third best 2G cells with at least one of the second set of RSSI measurements within the range threshold $T_R$ of the best 2G cell; and collecting a third set of RSSI measurements from the third best 2G cells.

According to another aspect, a user equipment for optimizing compressed mode duration, the user equipment comprising a processor; and a memory coupled to the processor, wherein the memory comprises program code executable by the processor for performing the following: collecting a first set of receive signal strength indication (RSSI) measurements from at least one 2G cell; determining a best 2G cell from the at least one 2G cell using the first set of RSSI measurements; identifying at least one second best 2G cells with at least one of the first set of RSSI measurements within a range threshold $T_R$ of the best 2G cell; collecting a second set of RSSI measurements from the second best 2G cells; identifying at least one third best 2G cells with at least one of the second set of RSSI measurements within the range threshold $T_R$ of the best 2G cell; and collecting a third set of RSSI measurements from the third best 2G cells.

According to another aspect, a wireless device for optimizing compressed mode duration comprising means for collecting a first set of receive signal strength indication (RSSI) measurements from at least one 2G cell; means for determining a best 2G cell from the at least one 2G cell using the first set of RSSI measurements; means for identifying at least one second best 2G cells with at least one of the first set of RSSI measurements within a range threshold $T_R$ of the best 2G cell; means for collecting a second set of RSSI measurements from the second best 2G cells; means for identifying at least one third best 2G cells with at least one of the second set of RSSI measurements within the range threshold $T_R$ of the best 2G cell; and means for collecting a third set of RSSI measurements from the third best 2G cells.

According to another aspect, a computer-readable medium including program code stored thereon, comprising program code for collecting a first set of receive signal strength indication (RSSI) measurements from at least one 2G cell; program code for determining a best 2G cell from the at least one 2G cell using the first set of RSSI measurements; program code for identifying at least one second best 2G cells with at least one of the first set of RSSI measurements within a range threshold $T_R$ of the best 2G cell; program code for collecting a second set of RSSI measurements from the second best 2G cells; program code for identifying at least one third best 2G cells with at least one of the second set of RSSI measurements within the range threshold $T_R$ of the best 2G cell; and program code for collecting a third set of RSSI measurements from the third best 2G cells.

Advantages of the present disclosure include reducing the compressed mode duration and increasing call reliability and quality.

It is understood that other aspects will become readily apparent to those skilled in the art from the following detailed description, wherein it is shown and described various aspects by way of illustration. The drawings and detailed description are to be regarded as illustrative in nature and not as restrictive.

DETAILED DESCRIPTION

The detailed description set forth below in connection with the appended drawings is intended as a description of various aspects of the present disclosure and is not intended to represent the only aspects in which the present disclosure may be practiced. Each aspect described in this disclosure is provided merely as an example or illustration of the present disclosure, and should not necessarily be construed as preferred or advantageous over other aspects. The detailed description includes specific details for the purpose of providing a thorough understanding of the present disclosure. However, it will be apparent to those skilled in the art that the present disclosure may be practiced without these specific details. In some instances, well-known structures and devices are shown in block diagram form in order to avoid obscuring the concepts of the present disclosure. Acronyms and other descriptive terminology may be used merely for convenience and clarity and are not intended to limit the scope of the disclosure.

While for purposes of simplicity of explanation, the methodologies are shown and described as a series of acts, it is to be understood and appreciated that the methodologies are not limited by the order of acts, as some acts may, in accordance with one or more aspects, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more aspects.

Figure 1:
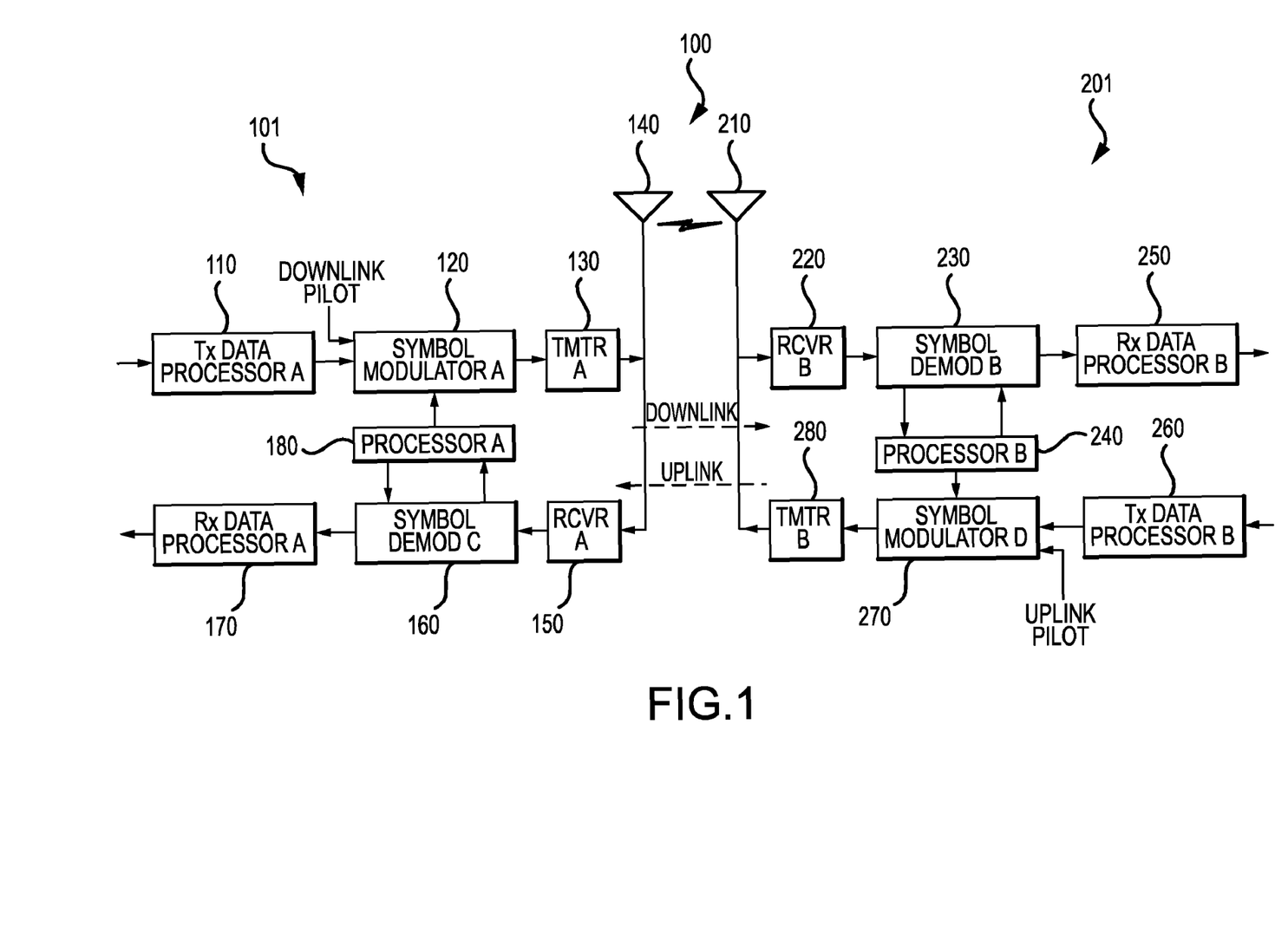
FIG. 1 is a block diagram illustrating an example access node/TUE system.

FIG. 1 is a block diagram illustrating an example access node/UE system 100. One skilled in the art would understand that the example access node/UE system 100 illustrated in FIG. 1 may be implemented in an FDMA environment, an OFDMA environment, a CDMA environment, a WCDMA environment, a TDMA environment, a SDMA environment or any other suitable wireless environment.

The access node/UE system 100 includes an access node 101 (a.k.a. base station) and a user equipment or UE 201 (a.k.a. wireless communication device). In the downlink leg, the access node 101 (a.k.a. base station) includes a transmit (TX) data processor A 110 that accepts, formats, codes, interleaves and modulates (or symbol maps) traffic data and provides modulation symbols (a.k.a. data symbols). The TX data processor A 110 is in communication with a symbol modulator A 120. The symbol modulator A 120 accepts and processes the data symbols and downlink pilot symbols and provides a stream of symbols. In one aspect, symbol modulator A 120 is in communication with processor A 180 which provides configuration information. Symbol modulator A 120 is in communication with a transmitter unit (TMTR) A 130. The symbol modulator A 120 multiplexes the data symbols and downlink pilot symbols and provides them to the transmitter unit A 130.

Each symbol to be transmitted may be a data symbol, a downlink pilot symbol or a signal value of zero. The downlink pilot symbols may be sent continuously in each symbol period. In one aspect, the downlink pilot symbols are frequency division multiplexed (FDM). In another aspect, the downlink pilot symbols are orthogonal frequency division multiplexed (OFDM). In yet another aspect, the downlink pilot symbols are code division multiplexed (CDM). In one aspect, the transmitter unit A 130 receives and converts the stream of symbols into one or more analog signals and further conditions, for example, amplifies, filters and/or frequency upconverts the analog signals, to generate an analog downlink signal suitable for wireless transmission. The analog downlink signal is then transmitted through antenna 140.

In the downlink leg, the UE 201 includes antenna 210 for receiving the analog downlink signal and inputting the analog downlink signal to a receiver unit (RCVR) B 220. In one aspect, the receiver unit B 220 conditions, for example, filters, amplifies, and frequency downconverts the analog downlink signal to a first "conditioned" signal. The first "conditioned" signal is then sampled. The receiver unit B 220 is in communication with a symbol demodulator B 230. The symbol demodulator B 230 demodulates the first "conditioned" and "sampled" signal (a.k.a. data symbols) outputted from the receiver unit B 220. One skilled in the art would understand that an alternative is to implement the sampling process in the symbol demodulator B 230. The symbol demodulator B 230 is in communication with a processor B 240. Processor B 240 receives downlink pilot symbols from symbol demodulator B 230 and performs channel estimation on the downlink pilot symbols. In one aspect, the channel estimation is the process of characterizing the current propagation environment. The symbol demodulator B 230 receives a frequency response estimate for the downlink leg from processor B 240. The symbol demodulator B 230 performs data demodulation on the data symbols to obtain data symbol estimates on the downlink path. The data symbol estimates on the downlink path are estimates of the data symbols that were transmitted. The symbol demodulator B 230 is also in communication with a RX data processor B 250.

The RX data processor B 250 receives the data symbol estimates on the downlink path from the symbol demodulator B 230 and, for example, demodulates (i.e., symbol demaps), interleaves and/or decodes the data symbol estimates on the downlink path to recover the traffic data. In one aspect, the processing by the symbol demodulator B 230 and the RX data processor B 250 is complementary to the processing by the symbol modulator A 120 and TX data processor A 110, respectively.

In the uplink leg, the UE 201 includes a TX data processor B 260. The TX data processor B 260 accepts and processes traffic data to output data symbols. The TX data processor B 260 is in communication with a symbol modulator D 270. The symbol modulator D 270 accepts and multiplexes the data symbols with uplink pilot symbols, performs modulation and provides a stream of symbols. In one aspect, symbol modulator D 270 is in communication with processor B 240 which provides configuration information. The symbol modulator D 270 is in communication with a transmitter unit B 280.

Each symbol to be transmitted may be a data symbol, an uplink pilot symbol or a signal value of zero. The uplink pilot symbols may be sent continuously in each symbol period. In one aspect, the uplink pilot symbols are frequency division multiplexed (FDM). In another aspect, the uplink pilot symbols are orthogonal frequency division multiplexed (OFDM). In yet another aspect, the uplink pilot symbols are code division multiplexed (CDM). In one aspect, the transmitter unit B 280 receives and converts the stream of symbols into one or more analog signals and further conditions, for example, amplifies, filters and/or frequency upconverts the analog signals, to generate an analog uplink signal suitable for wireless transmission. The analog uplink signal is then transmitted through antenna 210.

The analog uplink signal from UE 201 is received by antenna 140 and processed by a receiver unit A 150 to obtain samples. In one aspect, the receiver unit A 150 conditions, for example, filters, amplifies and frequency downconverts the analog uplink signal to a second "conditioned" signal. The second "conditioned" signal is then sampled. The receiver unit A 150 is in communication with a symbol demodulator C 160. One skilled in the art would understand that an alternative is to implement the sampling process in the symbol demodulator C 160. The symbol demodulator C 160 performs data demodulation on the data symbols to obtain data symbol estimates on the uplink path and then provides the uplink pilot symbols and the data symbol estimates on the uplink path to the RX data processor A 170. The data symbol estimates on the uplink path are estimates of the data symbols that were transmitted. The RX data processor A 170 processes the data symbol estimates on the uplink path to recover the traffic data transmitted by the wireless communication device 201. The symbol demodulator C 160 is also in communication with processor A 180. Processor A 180 performs channel estimation for each active terminal transmitting on the uplink leg. In one aspect, multiple terminals may transmit pilot symbols concurrently on the uplink leg on their respective assigned sets of pilot subbands where the pilot subband sets may be interlaced.

Processor A 180 and processor B 240 direct (i.e., control, coordinate or manage, etc.) operation at the access node 101 (a.k.a. base station) and at the UE 201, respectively. In one aspect, either or both processor A 180 and processor B 240 are associated with one or more memory units (not shown) for storing of program codes and/or data. In one aspect, either or both processor A 180 or processor B 240 or both perform computations to derive frequency and impulse response estimates for the uplink leg and downlink leg, respectively.

In one aspect, the access node/UE system 100 is a multiple-access system. For a multiple-access system (e.g., FDMA, OFDMA, CDMA, TDMA, SDMA, etc.), multiple terminals transmit concurrently on the uplink leg. In one aspect, for the multiple-access system, the pilot subbands may be shared among different terminals. Channel estimation techniques are used in cases where the pilot subbands for each terminal span the entire operating band (possibly except for the band edges). Such a pilot subband structure is desirable to obtain frequency diversity for each terminal.

Figure 2:
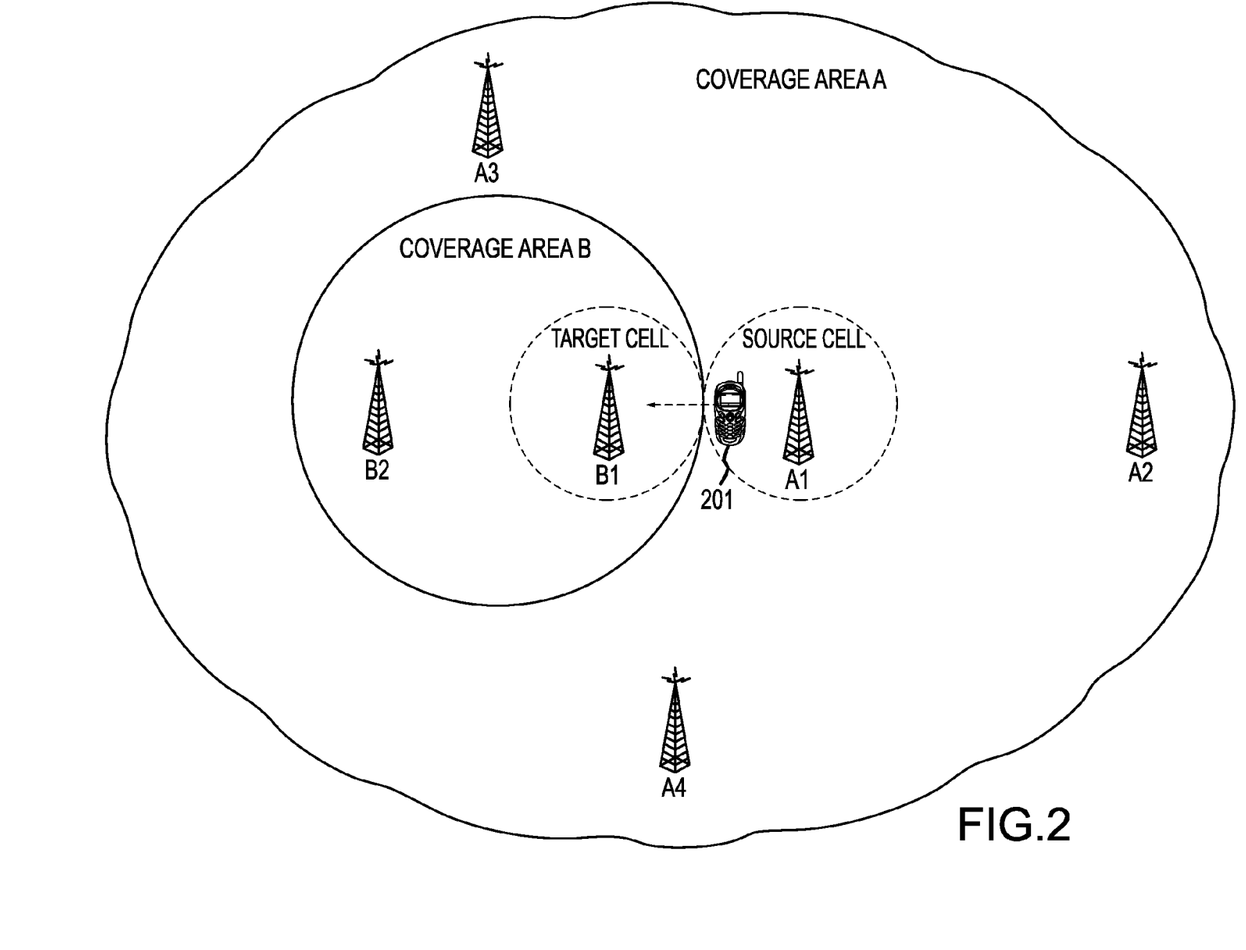
FIG. 2 illustrates an example of the user equipment (UE) within one coverage area A with access nodes $A_1, A_2, A_3, A_4$ and approaching the edge of another coverage area B with access nodes $B_1$ and $B_2$.

FIG. 2 shows an example of the UE 201 within one coverage area A with access nodes $A_1, A_2, A_3, A_4$ and within the edge of another coverage area B with access nodes $B_1$ and $B_2$. As shown in FIG. 2, UE 201 is located within the source cell within coverage area A and approaching the target cell within coverage area B. Coverage area A employs radio access technology A while coverage area B employs radio access technology B. Wireless system A is associated with coverage area A, and wireless system B is associated with coverage area B. In one aspect, as the UE 201 approaches the target cell, a comparison is made to determine if the signal quality from the target cell (a.k.a. target cell signal quality) is higher than the signal quality from the source cell (a.k.a. source cell signal quality). If the signal quality from the target cell is higher, than a transition is made from the source cell to the target cell, i.e., an inter-radio access technology (IRAT) transition is triggered from the source cell to the target cell. In one aspect, the signal quality from the target cell must be higher than the signal quality from the source cell for a continuous X time interval before the transition is made. In one example, the X time interval is 5 seconds.

Transitioning the wireless access connection of the UE 201 between wireless systems A and B requires a finite amount of time to complete. For example, if UE 201 starts in the source cell within coverage area A (e.g., a 3G coverage area employing 3G radio access technology by a 3G wireless system) and moves towards the target cell within coverage area B (e.g., a 2G coverage area employing 2G radio access technology by a 2G wireless system), the UE 201 may reselect to wireless system B (e.g., 2G wireless system) and start collecting system information from the access nodes within coverage area B. This process may not be completed for some time, e.g., several seconds such as 3-5 seconds for some systems. During this wait period, signal quality may be compromised, and signals may even be dropped, resulting in user dissatisfaction.

One skilled in the art would understand that the scope and spirit of the present disclosure are not affected by other examples of radio access technologies employed by other wireless systems, including but not limited to, UMTS, WCDMA, GSM, GSM/GPRS/EDGE, LTE, IS-95, CDMA2000, EVDO or UMB, etc.

While in connection with the 3G system, the UE is required to measure the receive signal strength indication (RSSI) for all neighboring 2G cells and identify the base station identification code (BSIC) of up to, for example, six cells. The UE reports the cells for which the BSIC has been identified or reconfirmed for handover to the GSM system.

To measure the RSSI, identify the BSIC and reconfirm BSIC for the best GSM cells, the optimized network opens three gaps in the 3G (e.g., WCDMA) radio frames called "compressed mode gaps". Handover to the 2G system (e.g. GSM) is expedited if the UE reports information about the measured GSM cells. Better call reliability and substantial network capacity gain would result from this improvement.

Currently, the UE is required to perform at least three RSSI measurements for each neighboring GSM cells for reliability. The maximum number of GSM cells in the neighbor list is 32, which implies that the ULE is required to take 96 samples before the first set of RSSI measurements are finished. The UE blindly takes 3 samples for each RSSI without giving any weighting to power measured in the first sample of these cells. Consequently, the UE might unnecessarily remain in compressed mode for a long time.

In current systems, the network configures 3 gaps during compressed mode and specifies that purpose of the gaps as: a) GAP1-RSSI measurement, b) GAP2-BSIC identification and c) GAP3-BSIC re-confirm. In a first step, the UE (e.g., UE 201) takes only one RSSI sample for all GSM cells and then takes the remaining two RSSI samples only for strong GSM cells. In one example, if the UE has 32 GSM cells in the NCELL list, then per the 3rd Generation Partnership Project; Technical Specification TS 25.133 (known to one skilled in the art), the UE should take at least 3 RSSI samples for each GSM cell, for a total of 96 RSSI samples in total. From the 3GPP TS 25.133 standard, in a typical compressed mode GAP length of 7 slots, the UE can complete only 6 RSSI measurements. Although GSM cells are used for illustration, one skilled in the art would understand that the disclosure is applicable to other types of 2G cells.

As a comparison, based the current 3GPP specification, the UE would need 1280 msec to finish the first set of RSSI measurements. That is, 96 samples requires 96/6=16 compressed mode gaps. Since each compressed mode gap is 80 msec, the total measurement time is (16*80) msec=1280 msec. However, with the present disclosure, the UE would need only 640 msec to finish the first set of RSSI measurements. That is, if the UE finished 3 samples for the top 6 neighbor cells, then it would need only 6*80 msec+2*80 msec=640 msec to finish the same set of measurements. Thus, in this example, there's a savings of 640 msec (i.e., 50%) to finish the same set of measurements.

In one aspect, after the UE has finished taking one sample of the RSSI measurements, the UE takes the second and third samples for a few cells based on the following criteria:
a) If the RSST of all the cells are fairly close to the best cell (e.g. within a 10 dB range), take measurements on these cells during the second set. Repeat these measurements during the third set if this condition is still true.
b) Eliminate cells that are below a range threshold, for example 10 dB, of the best cell (while keeping the top six 2G cells (e.g., GSM cells)) for the second and third measurement rounds.
c) Identify base station identity code (BSIC) for the cells chosen from steps a and b above.

One skilled in the art would understand that the range threshold may be chosen based on system and/or application parameters, design choices, operator choices, etc. without affecting the scope and spirit of the present disclosure.

Figure 3:
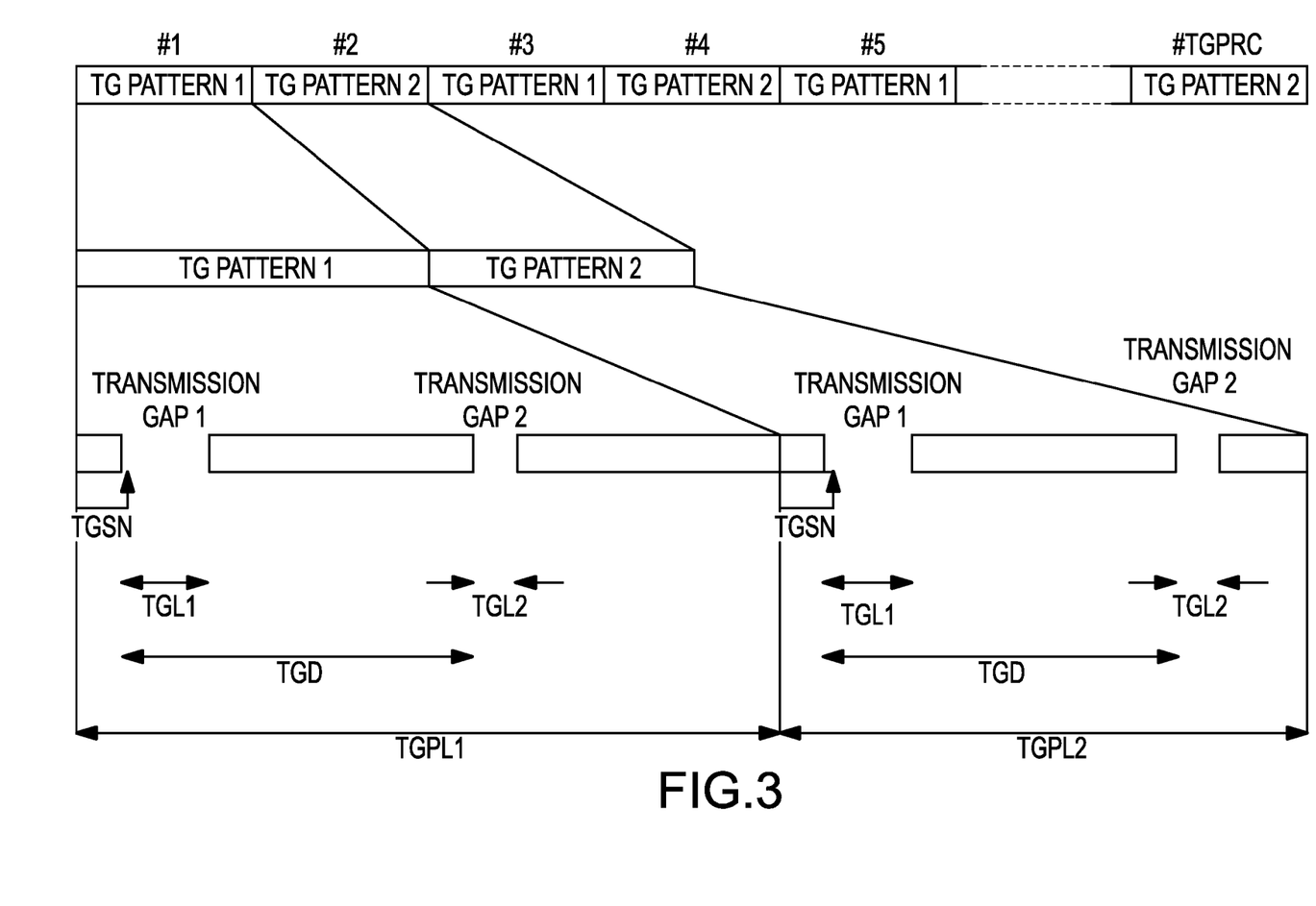
FIG. 3 illustrates an example of a UMTS timeline showing transmission gaps for UMTS compressed mode and various related timeline parameters.

FIG. 3 illustrates an example of a UMTS timeline showing transmission gaps for UMTS compressed mode and various related timeline parameters. During the transmission gaps (i.e., transmission gap 1, transmission gap 2, etc.) shown in FIG. 3, RSSI measurements of a plurality of 2G cells (e.g., GSM cells) are taken. Table 1 below illustrates the timing parameters shown in FIG. 3.

TGPRC: Transmission Gap Pattern Repetition Count. It indicates the number of transmission gap (TG) patterns within the TG pattern sequence.

TGCFN: Transmission Gap Connection Frame Number. It indicates the connection frame number (CFN) of the first radio frame of the first pattern within the TG pattern sequence.

TGSN: Transmission Gap Starting Slot Number. It indicates the slot number of the first TG slot within the first radio frame of the TG pattern.

TGL: Transmission Gap Length. It indicates the duration of the transmission gap in number of slots.

TGD: Transmission Gap Start Distance. It indicates the duration between the starting slots of two consecutive transmission gaps within a TG pattern, expressed in number of slots TGPL: Transmission Gap Pattern Length. It indicates the duration of the TG pattern expressed in number of frames.

CM: Compressed Mode Method. It is the method of achieving compressed mode. As listed in Table 1, SF/2 indicates the spreading factor is decreased by a factor of 2.

DL: Downlink Frame Type. It is the frame structure type for downlink compressed frames. Type A listed in Table 1 is an example. Type A maximizes the transmission gap length.

A more detailed explanation of the timing parameters illustrated in FIG. 3 and Table 1 is found in 3rd Generation Partnership Project; Technical Specification Group Radio Access Network; Physical layer - Measurements (FDD) 3GPP TS 25.215 which is known to one skilled in the art.

By optimizing the way in which the UE decides which GSM cells to measure in the available gap patterns, the compressed mode time is reduced substantially. This optimization increases call reliability and network capacity. In one example, the UE would need 49% less compressed mode patterns on average to finish the first round of RSSI measurements. After the UE has successfully finished the first round of RSSI measurements, the UE would start doing 3 measurements for each GSM cell and this optimization would not materialize.

Figure 4:
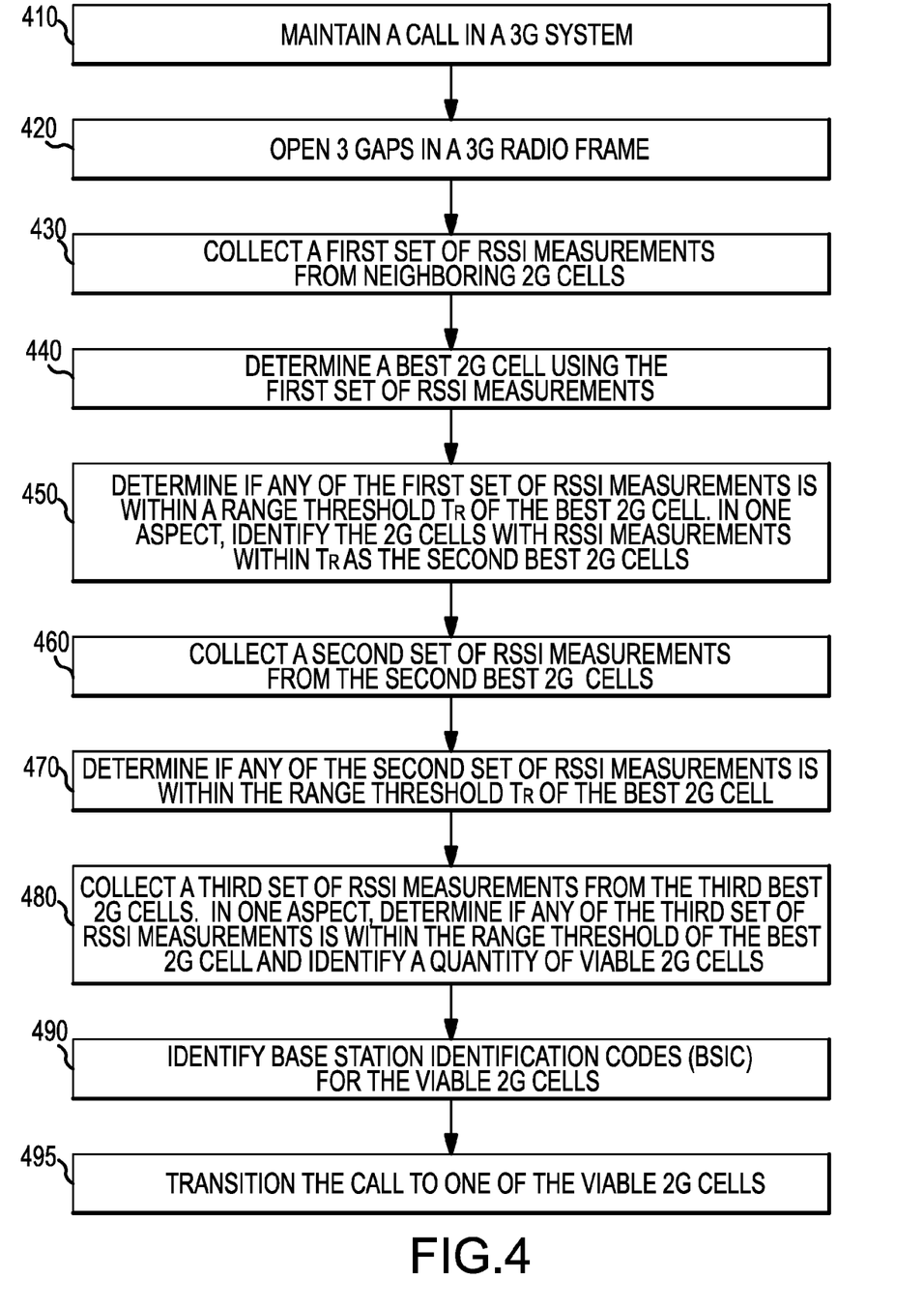
FIG. 4 illustrates an example flow diagram for optimizing compressed mode duration.

FIG. 4 illustrates an example flow diagram for optimizing compressed mode duration. In block 410, maintain a call in a 3G system. In one example, the 3G system uses a WCDMA technology. Following block 410, in block 420, open 3 gaps in a 3G radio frame. In one example, the 3G radio frame is a WCDMA radio frame. In one aspect, more or less than 3 gaps may be maintained without affecting the spirit or scope of the present disclosure. In block 430, which follows block 420, collect a first set of RSSI measurements from the neighboring 2G cells. In one aspect, the 2G cells are in a GSM system (i.e.,

TABLE 1

| TGMP | TGPRC | TGCFN | TGSN | TGL1 | TGL2 | TGD | TGPL1 | TGPL2 | CM Method | DL Frame Type |
|------|-------|-------|------|------|------|-----|-------|-------|-----------|---------------|
| 2 | 0 | X | 4 | 7 | 7 | 270 | 8 | 8 | SF/2 | A |
| 3 | 0 | X + 2 | 4 | 7 | 7 | 270 | 8 | 8 | SF/2 | A |
| 4 | 0 | X + 6 | 4 | 7 | 7 | 270 | 8 | 8 | SF/2 | A |

The acronyms used in Table 1 are described below with its respective functions:

TGMP: Transmission Gap Measurement Purpose. It states the type of measurement to obtain.

the 2G cells are GSM cells). One skilled in the art would understand that the term "neighboring" is not meant to include a strict definition of distance or range, but merely implies all available measurable 2G cells within range of being measured. Following block 430, in block 440, determine a best 2G cell using the first set of RSSI measurements and proceed to block 450. In one aspect, the best 2G cell is defined as the 2G cell with one or more of the following: strongest signal strength, closest range, least amount of signal interference, etc. In one example, the best 2G cell is one of the neighboring 2G cells. In block 450, determine if any of the first set of RSSI measurements is within a range threshold $T_R$ of the best 2G cell. Identify the 2G cells with RSSI measurements within the range threshold $T_R$ as the second best 2G cells. In one example, the range threshold is set at 10 dB. One skilled in the art would understand that the value of the range threshold can be chosen based on application or system parameters, designer choice, operation parameters, etc. without affecting the spirit or scope of the present disclosure.

Following block 450, in block 460, collect a second set of RSSI measurements from the second best 2G cells, and in block 470, determine if any of the second set of RSSI measurements is within the range threshold $T_R$ of the best 2G cell. Identify from the second best 2G cells with RSSI measurements within the range threshold as the third best 2G cells. In block 480, which follows block 470, collect a third set of RSSI measurements from the third best 2G cells. Also, determine if any of the third set of RSSI measurements is within the range threshold of the best 2G cell. Based on comparisons of the RSSI measurements to the best 2G cell, identify a quantity of viable 2G cells. In one aspect, one of the viable 2G cells is the best 2G cell. In one aspect, the viable 2G cells are 2G cells that have been identified in both categories of the second best 2G cells and the third best 2G cells. In another aspect, the viable 2G cells are cells that have been identified in either or both categories of the second best 2G cells and the third best 2G cells. In one example, the quantity is chosen as six. However, one skilled in the art would understand that the quantity of six is used as an example and that other quantities may be chosen based on application, operation or design parameters without affecting the spirit or scope of the present disclosure.

Following block 480, in block 490, identify base station identification codes (BSIC) for the viable 2G cells. And, in block 495, following block 490, transition the call to one of the viable 2G cells. In one aspect, the 3G cell is part of WCDMA system. In one aspect, the 2G cell is part of a GSM system. However, one skilled in the art would understand that the present disclosure is equally applicable to transition between any coverage areas of any radio access technologies employed by any wireless systems, including but not limited to, UMTS (universal mobile telecommunication system), WCDMA (wideband code division multiple access), GSM (Global System for Mobile communications), GSM/GPRS (General Packet Radio Service)/EDGE (Enhanced Data Rates for GSM Evolution), LTE (long term evolution), IS-95 (interim standard 95), CDMA2000, EVDO (evolution data optimized) or UMB (ultra mobile broadband), etc.

One skilled in the art would understand that the steps disclosed in the example flow diagram in FIG. 4 can be interchanged in their order without departing from the scope and spirit of the present disclosure. Also, one skilled in the art would understand that the steps illustrated in the flow diagram are not exclusive and other steps may be included or one or more of the steps in the example flow diagram may be deleted without affecting the scope and spirit of the present disclosure.

Those of skill would further appreciate that the various illustrative components, logical blocks, modules, circuits, and/or algorithm steps described in connection with the examples disclosed herein may be implemented as electronic hardware, firmware, computer software, or combinations thereof. To clearly illustrate this interchangeability of hardware, firmware and software, various illustrative components, blocks, modules, circuits, and/or algorithm steps have been described above generally in terms of their functionality. Whether such functionality is implemented as hardware, firmware or software depends upon the particular application and design constraints imposed on the overall system. Skilled artisans may implement the described functionality in varying ways for each particular application, but such implementation decisions should not be interpreted as causing a departure from the scope or spirit of the present disclosure.

For example, for a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described therein, or a combination thereof. With software, the implementation may be through modules (e.g., procedures, functions, etc.) that perform the functions described therein. The software codes may be stored in memory units and executed by a processor unit. Additionally, the various illustrative flow diagrams, logical blocks, modules and/or algorithm steps described herein may also be coded as computer-readable instructions carried on any computer-readable medium known in the art or implemented in any computer program product known in the art.

In one or more examples, the steps or functions described herein may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Figure 5:
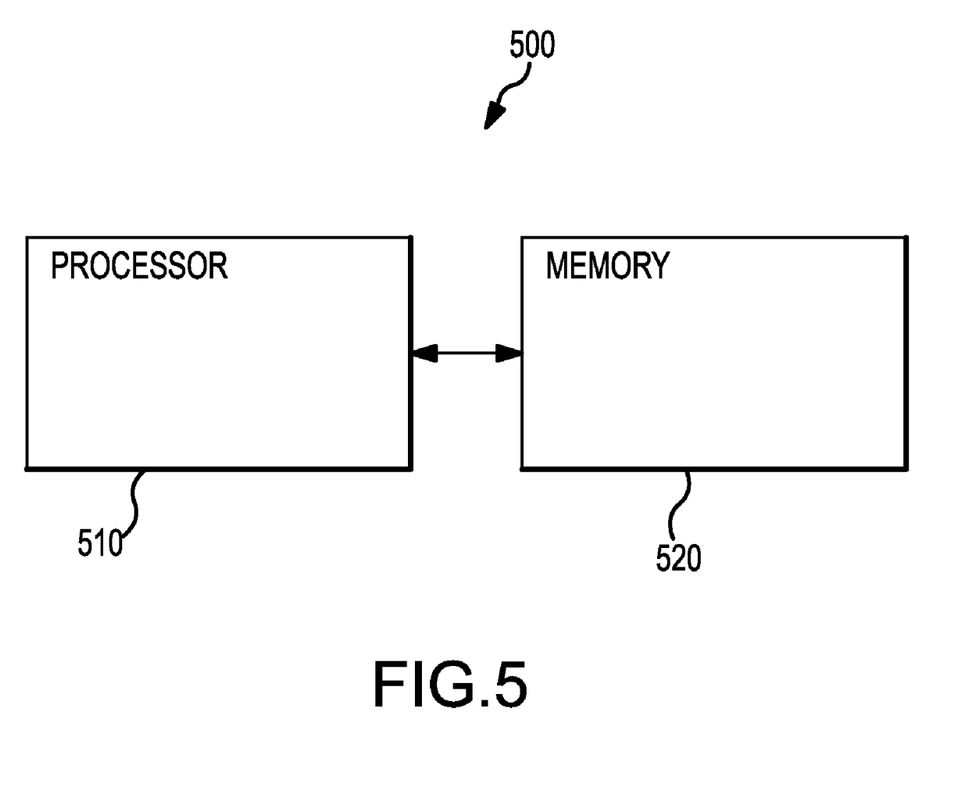
FIG. 5 illustrates an example of a device comprising a processor in communication with a memory for executing the processes for optimizing compressed mode duration.

In one example, the illustrative components, flow diagrams, logical blocks, modules and/or algorithm steps described herein are implemented or performed with one or more processors. In one aspect, a processor is coupled with a memory which stores data, metadata, program instructions, etc. to be executed by the processor for implementing or performing the various flow diagrams, logical blocks and/or modules described herein. FIG. 5 illustrates an example of a device 500 comprising a processor 510 in communication with a memory 520 for executing the processes for optimizing compressed mode duration. In one example, the device 500 is used to implement the algorithm illustrated in FIG. 4. In one aspect, the memory 520 is located within the processor 510. In another aspect, the memory 520 is external to the processor 510. In one aspect, the processor includes circuitry for implementing or performing the various flow diagrams, logical blocks and/or modules described herein.

Figure 6:
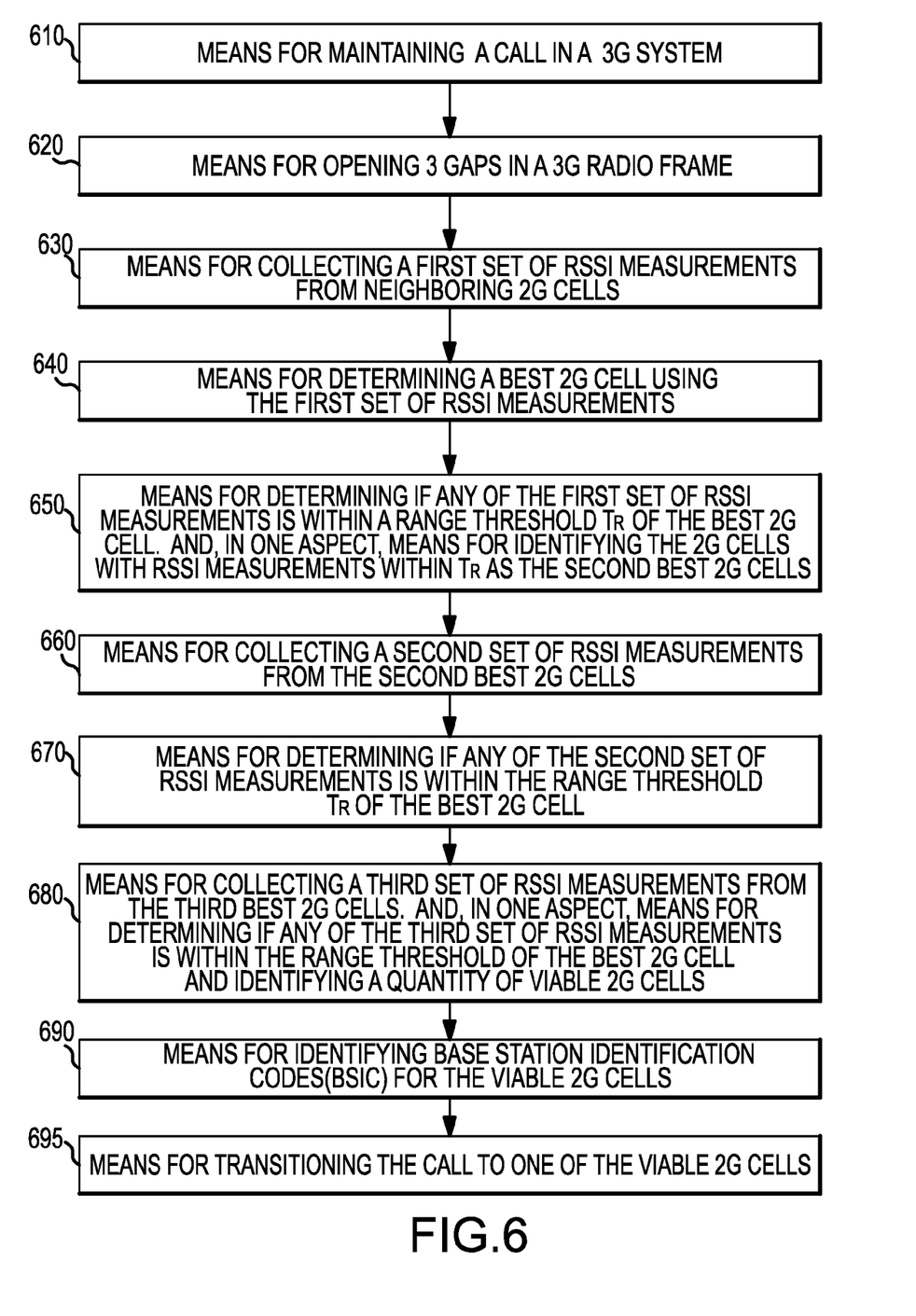
FIG. 6 illustrates an example of a device suitable for optimizing compressed mode duration.

FIG. 6 illustrates an example of a device 600 suitable for optimizing compressed mode duration. In one aspect, the device 600 is implemented by at least one processor comprising one or more modules configured to provide different aspects of optimizing compressed mode duration as described herein in blocks 610, 620, 630, 640, 650, 660, 670, 680, 690 and 695. For example, each module comprises hardware, firmware, software, or any combination thereof. In one aspect, the device 600 is also implemented by at least one memory in communication with the at least one processor.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the spirit or scope of the disclosure.

The invention claimed is:

1. A method for optimizing compressed mode duration comprising:
   collecting, at a wireless device, a first set of receive signal strength indication (RSSI) measurements from at least one cell;
   determining a best cell from the at least one cell using the first set of RSSI measurements;
   identifying at least one second best cells with at least one of the first set of RSSI measurements within a range threshold $T_R$ of the best cell;
   collecting, at the wireless device, a second set of RSSI measurements from the second best cells;
   identifying at least one third best cells with at least one of the second set of RSSI measurements within the range threshold $T_R$ of the best cell; and
   collecting, at the wireless device, a third set of RSSI measurements from the third best cells.

2. The method of claim 1 further comprising:
   determining if any of the first set of RSSI measurements is within the range threshold $T_R$ of the best cell; and
   determining if any of the second set of RSSI measurements is within the range threshold $T_R$ of the best cell.

3. The method of claim 2 further comprising determining if any of the third set of RSSI measurements is within the range threshold $T_R$ of the best cell.

4. The method of claim 3 further comprising identifying at least one viable cells.

5. The method of claim 4 wherein one of the at least one viable cells is the best cell.

6. The method of claim 4 wherein the at least one viable cells include a cell from the second best cells.

7. The method of claim 4 wherein the at least one viable cells include a cell from the third best cells.

8. The method of claim 4 wherein the at least one viable cells include a cell from the second best cells and another cell from the third best cells.

9. The method of claim 4 further comprising identifying base station identification codes (BSIC) for the at least one viable cells.

10. The method of claim 9 further comprising transitioning to one of the at least one viable cells.

11. The method of claim 1 further comprising opening three gaps in a third generation (3G) radio frame for the collecting steps, and wherein the at least one cell is a second generation (2G) cell.

12. The method of claim 11 wherein 3G is one of the following: UMTS (universal mobile telecommunication system), WCDMA (wideband code division multiple access), LTE (long term evolution), CDMA2000, EVDO (evolution data optimized) or UMB (ultra mobile broadband).

13. The method of claim 11 wherein 2G is one of the following: GSM (Global System for Mobile communications), GSM/GPRS (General Packet Radio Service) /EDGE (Enhanced Data Rates for GSM Evolution) or IS-95 (interim standard 95).

14. The method of claim 1 wherein the range threshold $T_R$ is 10 dB.

15. The method of claim 1 further comprising identifying at least 6 viable cells for transitioning, wherein the 6 viable cells include the best cell and one or more cells from the second best cells and the third best cells.

16. A user equipment for optimizing compressed mode duration, the user equipment comprising
   a processor; and
   a memory coupled to the processor, wherein the memory comprises program code executable by the processor for performing the following:
      collecting a first set of receive signal strength indication (RSSI) measurements from at least one cell;
      determining a best cell from the at least one cell using the first set of RSSI measurements;
      identifying at least one second best cells with at least one of the first set of RSSI measurements within a range threshold $T_R$ of the best cell;
      collecting a second set of RSSI measurements from the second best cells;
      identifying at least one third best cells with at least one of the second set of RSSI measurements within the range threshold $T_R$ of the best cell; and
      collecting a third set of RSSI measurements from the third best cells.

17. The user equipment of claim 16 wherein the memory further comprises program code for:
   determining if any of the first set of RSSI measurements is within the range threshold $T_R$ of the best cell; and
   determining if any of the second set of RSSI measurements is within the range threshold $T_R$ of the best cell.

18. The user equipment of claim 17 wherein the memory further comprises program code for determining if any of the third set of RSSI measurements is within the range threshold $T_R$ of the best cell.

19. The user equipment of claim 18 wherein the memory further comprises program code for identifying at least one viable cells.

20. The user equipment of claim 19 wherein one of the at least one viable cells is the best cell.

21. The user equipment of claim 19 wherein the at least one viable cells include a cell from the second best cells.

22. The user equipment of claim 19 wherein the at least one viable cells include a cell from the third best cells.

23. The user equipment of claim 19 wherein the at least one viable cells include a cell from the second best cells and another cell from the third best cells.

24. The user equipment of claim 19 wherein the memory further comprises program code for identifying base station identification codes (BSIC) for the at least one viable cells.

25. The user equipment of claim 24 wherein the memory further comprises program code for transitioning to one of the at least one viable cells.

26. The user equipment of claim 16 wherein the memory further comprises program code for using three gaps in a third generation (3G) radio frame for the collecting functions, and wherein the at least one cell is a second generation (2G) cell.

27. The user equipment of claim 26 wherein 3G is one of the following:
   UMTS (universal mobile telecommunication system), WCDMA (wideband code division multiple access), LTE (long term evolution), CDMA2000, EVDO (evolution data optimized) or UMB (ultra mobile broadband).

28. The user equipment of claim 26 wherein 2G is one of the following: GSM (Global System for Mobile communications), GSM/GPRS (General Packet Radio Service) /EDGE (Enhanced Data Rates for GSM Evolution) or IS-95 (interim standard 95).

29. The user equipment of claim 16 wherein the range threshold $T_R$ is 10 dB.

30. The user equipment of claim 16 wherein the memory further comprises program code for identifying at least 6 viable cells for transitioning, wherein the 6 viable cells include the best cell and one or more cells from the second best cells and the third best cells.

31. A wireless device for optimizing compressed mode duration comprising:
   means for collecting a first set of receive signal strength indication (RSSI) measurements from at least one cell;
   means for determining a best cell from the at least one cell using the first set of RSSI measurements;
   means for identifying at least one second best cells with at least one of the first set of RSSI measurements within a range threshold $T_R$ of the best cell;
   means for collecting a second set of RSSI measurements from the second best cells;
   means for identifying at least one third best cells with at least one of the second set of RSSI measurements within the range threshold $T_R$ of the best cell; and
   means for collecting a third set of RSSI measurements from the third best cells.

32. The wireless device of claim 31 further comprising:
   means for determining if any of the first set of RSSI measurements is within the range threshold $T_R$ of the best cell; and
   means for determining if any of the second set of RSSI measurements is within the range threshold $T_R$ of the best cell.

33. The wireless device of claim 32 further comprising means for determining if any of the third set of RSSI measurements is within the range threshold $T_R$ of the best cell.

34. The wireless device of claim 33 further comprising means for identifying at least one viable cells.

35. The wireless device of claim 34 wherein one of the at least one viable cells is the best cell.

36. The wireless device of claim 34 wherein the at least one viable cells include a cell from the second best cells.

37. The wireless device of claim 34 wherein the at least one viable cells include a cell from the third best cells.

38. The wireless device of claim 34 wherein the at least one viable cells include a cell from the second best cells and another cell from the third best cells.

39. The wireless device of claim 34 further comprising means for identifying base station identification codes (BSIC) for the at least one viable cells.

40. The wireless device of claim 39 further comprising means for transitioning to one of the at least one viable cells.

41. The wireless device of claim 31 wherein the means for collecting uses three gaps in a third generation (3G) radio frame, and wherein the at least one cell is a second generation (2G) cell.

42. The wireless device of claim 41 wherein 3G is one of the following:
   UMTS (universal mobile telecommunication system), WCDMA (wideband code division multiple access), LTE (long term evolution), CDMA2000, EVDO (evolution data optimized) or UMB (ultra mobile broadband).

43. The wireless device of claim 41 wherein 2G is one of the following: GSM (Global System for Mobile communications), GSM/GPRS (General Packet Radio Service) /EDGE (Enhanced Data Rates for GSM Evolution) or IS-95 (interim standard 95).

44. The wireless device of claim 31 wherein the range threshold $T_R$ is 10 dB.

45. The wireless device of claim 31 further comprising means for identifying at least 6 viable cells for transitioning, wherein the 6 viable cells include the best cell and one or more cells from the second best cells and the third best cells.

46. A non-transitory computer-readable medium including program code stored thereon, comprising:
   program code for collecting a first set of receive signal strength indication (RSSI) measurements from at least one cell;
   program code for determining a best cell from the at least one cell using the first set of RSSI measurements;
   program code for identifying at least one second best cells with at least one of the first set of RSSI measurements within a range threshold $T_R$ of the best cell;
   program code for collecting a second set of RSSI measurements from the second best cells;
   program code for identifying at least one third best cells with at least one of the second set of RSSI measurements within the range threshold $T_R$ of the best cell; and
   program code for collecting a third set of RSSI measurements from the third best cells.

47. The computer-readable medium of claim 46 further comprising:
   program code for determining if any of the first set of RSSI measurements is within the range threshold $T_R$ of the best cell; and
   program code for determining if any of the second set of RSSI measurements is within the range threshold $T_R$ of the best cell.

48. The computer-readable medium of claim 47 further comprising program code for determining if any of the third set of RSSI measurements is within the range threshold $T_R$ of the best cell.

49. The computer-readable medium of claim 48 further comprising program code for identifying at least one viable cells.

50. The computer-readable medium of claim 49 wherein one of the at least one viable cells is the best cell.

51. The computer-readable medium of claim 49 wherein the at least one viable cells include a cell from the second best cells.

52. The computer-readable medium of claim 49 wherein the at least one viable cells include a cell from the third best cells.

53. The computer-readable medium of claim 49 wherein the at least one viable cells include a cell from the second best cells and another cell from the third best cells.

54. The computer-readable medium of claim 49 further comprising program code for identifying base station identification codes (BSIC) for the at least one viable cells.

55. The computer-readable medium of claim 54 further comprising program code for transitioning to one of the at least one viable cells.

56. The computer-readable medium of claim 46 wherein the program code for collecting uses three gaps in a third generation (3G) radio frame, and wherein the at least one cell is a second generation (2G) cell.

57. The computer-readable medium of claim 56 wherein 3G is one of the following: UMTS (universal mobile telecommunication system), WCDMA (wideband code division multiple access), LTE (long term evolution), CDMA2000, EVDO (evolution data optimized) or UMB (ultra mobile broadband).

58. The computer-readable medium of claim 56 wherein 2G is one of the following: GSM (Global System for Mobile communications), GSM/GPRS (General Packet Radio Service) /EDGE (Enhanced Data Rates for GSM Evolution) or IS-95 (interim standard 95).

59. The computer-readable medium of claim 46 wherein the range threshold $T_R$ is 10 dB.

60. The computer-readable medium of claim 46 further comprising program code for identifying at least 6 viable cells for transitioning, wherein the 6 viable cells include the best cell and one or more cells from the second best cells and the third best cells.

* * * * *